Figure 1:
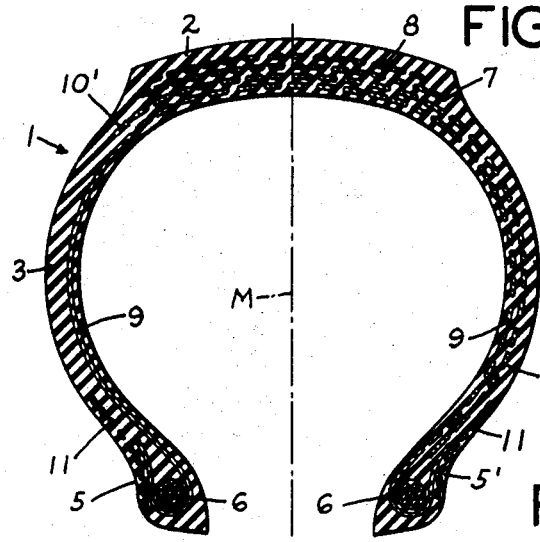

United States Patent

[11] 3,536,118

| [72] | Inventor | Jacques Boileau<br>Clermont-Ferrand, France |
|---|---|---|
| [21] | Appl. No. | 651,848 |
| [22] | Filed | July 7, 1967 |
| [45] | Patented | Oct. 27, 1970 |
| [73] | Assignee | Compagnie Generale Des Etablissements<br>Michelin, raison sociale Michelin & Cie<br>Clermont-Ferrand(Puy-de-Dome), France |
| [32] | Priority | July 11, 1966 |
| [33] | | France |
| [31] | | 69,044 |

[54] PNEUMATIC TIRES
9 Claims, 8 Drawing Figs.

[52] U.S. Cl. ................................................. 152/356,
152/361
[51] Int. Cl. ..................................................... B60c 9/06,
B60c 9/20
[50] Field of Search.......................................... 152/354,
355, 356, 361, 352, 330, 354

[56] References Cited
UNITED STATES PATENTS

| 3,231,000 | 1/1966 | Massoubre ................... | 152/361 |
|---|---|---|---|
| 3,327,753 | 6/1967 | Travers ......................... | 152/356 |
| 3,339,610 | 9/1967 | Fausti et al. .................. | 152/354 |
| 3,395,745 | 8/1968 | Massoubre ................... | 152/361 |
| FOREIGN PATENTS | | | |
| 1,444,271 | 5/1966 | France ......................... | 152/361 |

*Primary Examiner*—Arthur L. La Point
*Assistant Examiner*—Charles B. Lyon
*Attorney*—Brumbaugh, Graves, Donohue and Raymond

ABSTRACT: An improvement in pneumatic tires of the radial carcass or ply type in which the sidewall of the tire to be disposed adjacent the outside of a wheel on a vehicle is stiffened by means of an arrangement of the plies therein, the plies in the stiffer sidewall having cords in crossing or bias relation while the cords in the carcass in the inner sidewall of the tire adjacent the inside of the wheel are rendered more flexible by disposing the cords of the ply or plies radially or at most in only slightly inclined relation to the radii of the tire, the asymmetrical construction of the tire being further modified in some forms of the tire by an asymmetrical arrangement of tread reinforcing plies and by forming the sidewalls of different radii of curvature.

Patented Oct. 27, 1970

3,536,118

Sheet 1 of 2

INVENTOR
JACQUES BOILEAU
BY
HIS ATTORNEYS

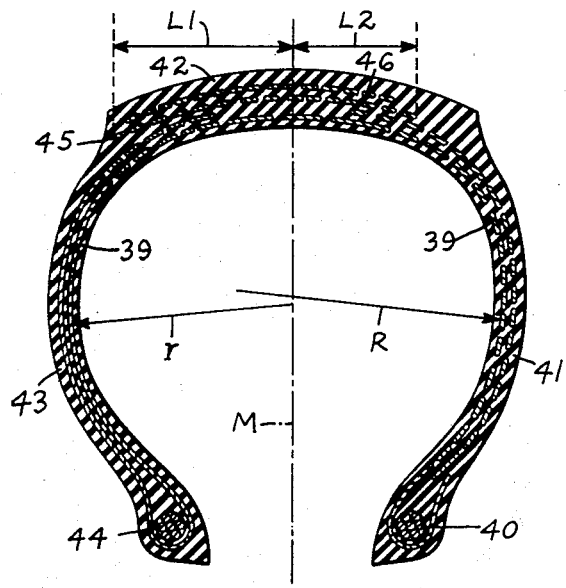
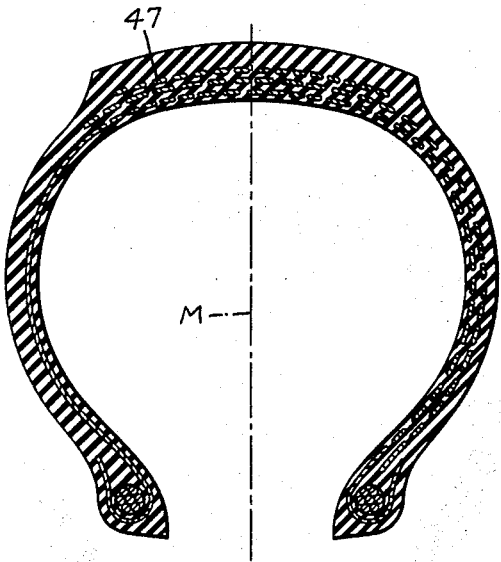
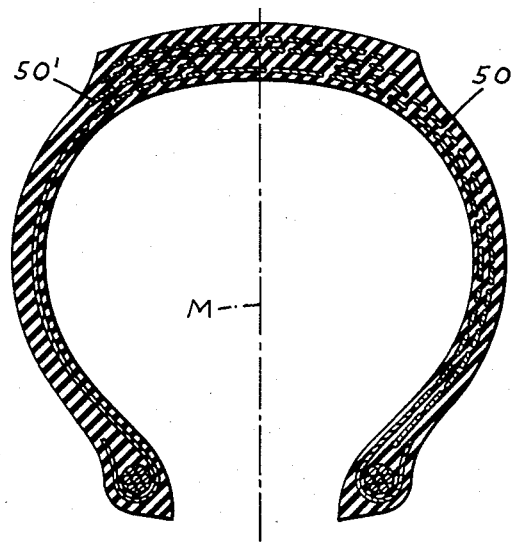
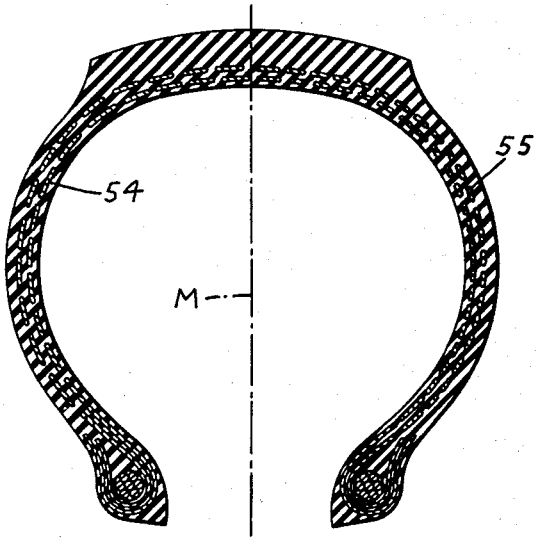

PNEUMATIC TIRES

The present invention relates to improvements in pneumatic tires, and more particularly to improvements in radial cord or radial ply tires to impart improved stability to the tires when traveling at high speed in a straight line and while negotiating turns.

Radial ply tires are well known in the art and are characterized by one or more plies of cords in the carcass of the tire in which the cords extend generally radially of the tire and thereby provide sidewalls of enhanced flexibility. Usually in such radial ply tires, the tread is provided with two or more tread plies of crossed cords which stiffen the tread and provide the tire with enhanced roadability and greatly improved tread wear.

In accordance with the present invention, the carcass of the tire is provided with a modified relation of the cords of the piles therein in order to improve the stability of the tires when traveling in a straight line or in rounding curves at high speed. More particularly, in accordance with the present invention, the tires have carcasses of an asymmetric construction which stiffens the sidewall that is to be disposed adjacent the outside of a wheel of a vehicle while retaining the flexibility of the sidewall disposed adjacent the inside of the wheel, thereby rendering the tire more resistant against lateral thrust while at the same time retaining the riding comfort of the prior radial ply tires. The carcass construction of the new tires includes a ply which extends from one bead of the tire to the other, that is, through both of the sidewalls and beneath or behind the tread, the portion of the ply disposed in one sidewall to be disposed adjacent the inside of the vehicle wheel having the cords extending in a radial or substantially radial direction while the portion of the ply beneath the tread is disposed obliquely with respect to the median plane of the tire and, in the outer sidewall of the tire, is nonradially inclined. An additional cord ply is included in the outer sidewall of the tire with the cords of this ply crossing or disposed obliquely with respect to the cords in the first-mentioned ply in the sidewall. The crossed relation of the cords of the plies in the outer sidewall and the use of two plies therein renders the outer sidewall considerably stiffer than the inner sidewall and thus more resistant to lateral thrust produced by rounding corners at high speed and further stabilizes the tire during straight line movement of the vehicle at high speeds. Additional stiffening by asymmetric construction of the tire can be obtained by placing the tread plies offset with respect to the median plane of the tire or by causing the tread plies to cross each other at different angles within the tread and by making the curvature of the outer sidewall in cross section less than the curvature of the inner sidewall. By making the outer sidewall stiffer and more resistant to thrust, the entire tire is stabilized in use while at the same time providing one sidewall which is flexible to retain the riding comfort of the tire to a major degree. Tires of the type described can be manufactured on a conventional tire building drum and by relating the plies properly during building of the tire on the drum, the desired inclinations of the cords of the plies can readily be obtained due to the relative shifting of the cords as the cylindrical rough tire form is shaped into the rough toroidal tire form which is thereafter vulcanized and molded.

To facilitate the positioning of the cords in the plies, the tread reinforcing plies and the tread are applied to the toroidal tire form rather than to the cylindrical rough tire form.

Figure 2:
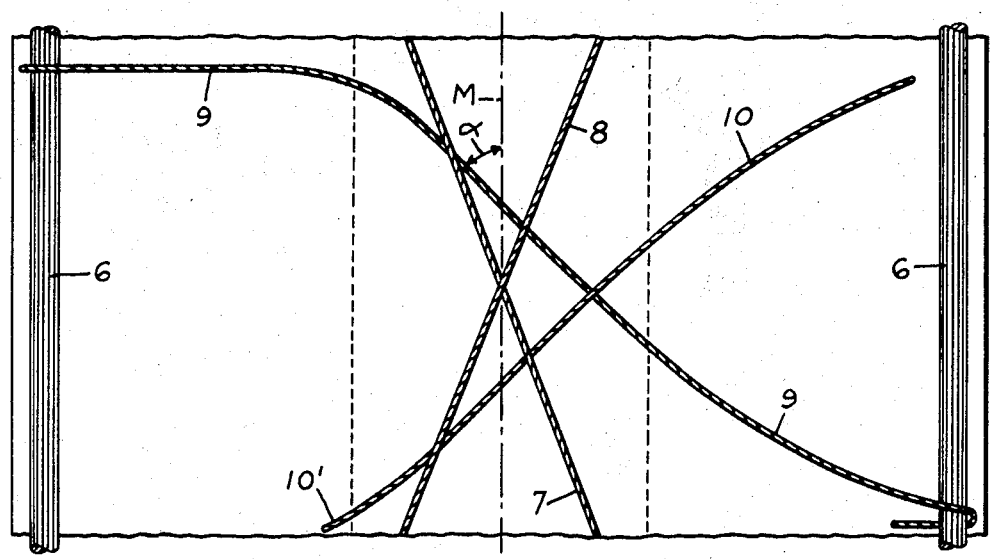

For a better understanding of the present invention, reference may be had to the accompanying drawings, in which FIG. 1 is a radial sectional view of a tire embodying the invention;

FIG. 2 is a developed plan view thereof illustrating the arrangement of the cords of the tire; and FIGS. 3 to 8 are radial cross-sectional views of modified forms of tires embodying the invention.

In all of the cross-sectional views, the continuous cords represent radial cords, i.e., cords arranged in the planes passing through the axis of rotation of the tire while the cords shown in section represent cords inclined to the radii of the tire, the length of the sections increasing as the inclination of the cords decreases.

In the tires, in accordance with FIGS. 1 to 8, the stiffer side intended to be placed on the outside of a wheel is the right side. In the examples in FIGS. 1 to 7, the desired greater stiffness is obtained by means of cords diverging from the radial direction and in crossing relation, while the left sidewall contains only radial cords.

The tire disclosed in FIGS. 1 and 2 comprises a tread 2 joined to the sidewalls 3 and 4, each ending in the beads 5 and 5' and each containing a bead wire or cable 6. The tread 2 is stiffened by means of a reinforcement consisting of two plies of cords 7 and 8 formed of natural or synthetic fibers, or metallic or nonmetallic filaments, each ply containing parallel cords with the cords of one ply crossing or inclined relatively (obliquely) to the cords of the other ply. The sidewalls 3 and 4 contain a ply of parallel cords 9 which are arranged radially between the bead 5 of the sidewall 3 and the edge of the tread and form with the longitudinal median plane M an angle of 90°. Between the edge of the tread 2 adjacent the sidewall 3 and the plane M, the cords of the ply 9 bend and are inclined to the plane M an angle $\alpha$ of approximately 50°. Beyond this plane, the angle formed by the cords of the ply 9 with the plane M increases gradually so that the cords in the sidewall 4 are inclined to the bead 5' at an angle of approximately 75°. A second ply of cords 10 is disposed outside of the ply 9 and extends from the bead 5' to an edge 10' at the remote edge of the tread 2. The cords of this ply 10 cross the cords of the ply 9 and form, with the plane M, angles which progressively decrease between the bead 5' and the median plane M, then increase in angularity beyond the median plane as far as the edge 10' of the ply 10. If desired, each bead may be stiffened by means of a narrow ply 11 of cords which are inclined (laid on a bias) with respect to the radial direction.

The cords of the plies 9 and 10 may be formed of any suitable natural or synthetic fiber or fibers or metallic or nonmetallic filaments.

Figure 3:
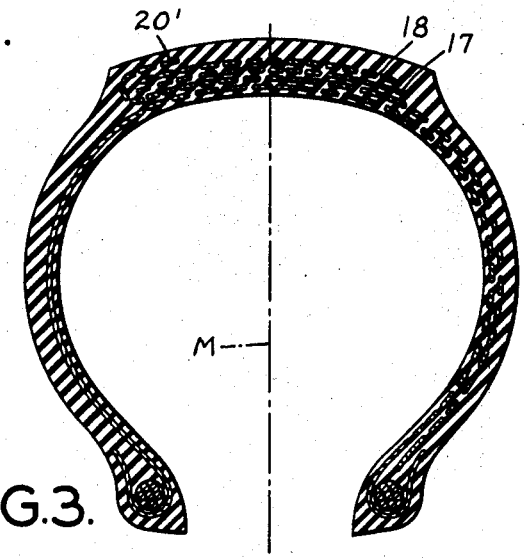

The reinforcement shown schematically in FIG. 3 differs from that in FIGS. 1 and 2 for the reason that the edge portion 20' of the ply 20 is folded back over the two plies 17 and 18 and the narrow ply 11 is omitted from the beads. The portion 20' of the ply 20 which is turned back over the plies 17 and 18 forms an asymmetric reinforcement of the tread in addition to the asymmetry of the sidewall reinforcement.

Figure 4:
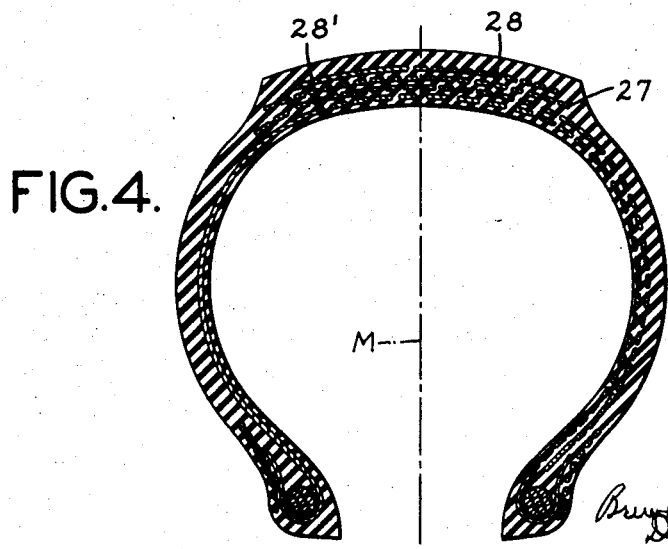

The reinforcement shown schematically in FIG. 4 differs from that in FIGS. 1 and 2 in that the tread ply overlying the ply 27 is divided into two plies 28 and 28' consisting of cords which are inclinded at angles of 30° and 90°, respectively, with respect to the median plane M. This provision constitutes an asymmetry of the reinforcement of the tread which adds to the asymmetry of the reinforcement of the sidewalls.

The reinforcement shown schmetically in FIG. 5 differs from the reinforcement shown in FIGS. 1 and 2 in that the ply 39 extends from the bead wire 40, through the sidewall 41, beneath the tread 42, through the sidewall 43 around the bead wire 44 and through the sidewall 43 to or beneath the left-hand edge of the tread 42. The radius of curvature R of the outer sidewall 41 is longer than the radius of curvature r of the inner sidewall 43 which increases the stiffness of the outer sidewall. Moreover, the tread plies 45 and 46 are not arranged symmetrically in relation to the plane M, the width L1 of these plies being greater to the left of said plane than to the right of it (width L2). The cords of the ply 39 in the sidewall 43 may depart from perpendicular to the plane M up to 10°, in which case the reinforcement of the sidewall 43 consists of slightly crossed cords. The tire, accordingly, has an asymmetric tread and asymmetric sidewalls.

The reinforcement shown schematically in FIG. 6 differs from that shown in FIGS. 1 and 2 in that it has only one single stiffening ply 47 for the tread and no bead reinforcing ply corresponding to ply 11.

The reinforcement shown schematically in FIG. 7 differs from the reinforcement shown in FIGS. 1 and 2 solely in that the ply 50 (corresponding to ply 10 in FIGS. 1 and 2) is interrupted in the vicinity of the median plane M, providing a narrow ply 50' to the left of the median plane M, and the bead reinforcing plies corresponding to plies 11 (FIGS. 1 and 2) are omitted.

The reinforcement shown schematically in FIG. 8 differs from the reinforcements previously described for the reason that it consists exclusively of plies of cords which are inclined with respect to the radial direction and cross each other. In this example, the cords of the plies 54 and 55 are inclined at an average angle of approximately 10° with respect to the radial direction in the portion located to the left of the plane M, while in the portion to the right of the median plane, they form with the radial direction an angle averaging approximately 25°, which renders the sidewall 4 more rigid than the sidewall 3. With this reinforcement, the tread does not require reinforcement with plies similar to plies 7 and 8 (FIGS. 1 and 2) but such stiffening plies can be included.

A method for manufacture of tires containing reinforcements of the kind shown in FIGS. 1 and 2 comprises placing around a tire building drum the inner ply 9 (FIG. 1) with its cords extending parallel to the generating lines of the drum between the two bead wires or cables, then adhering the ply 10 to the ply 9 with the cords of ply 10 crossing, inclined or oblique to the cords of the ply 9 and with the cords of the ply 10 extending from the vicinity of the bead wire 6 of the bead 5' to a point corresponding to edge 10' shown in FIG. 1. The cylindrical tire structure is then expanded and shaped in the usual way into a roughly toroidal tire form. During shaping of the tire, the diameter of the cylindrical structure is considerably increased, especially in its median plane, and consequently the inclined cords of the ply 10 which cross the radial cords of the ply 9 cause the latter to shift out of their radial positions and incline in a direction opposite to that of the cords of the ply 10. The tread stiffening plies 7 and 8 are applied to the formed tire prior to molding and vulcanizing.

The other forms of tires disclosed herein can be manufactured in a similar manner.

It will be understood that other modifications of the tires are possible including the use of elastomers having different modules of elasticity and the use of different numbers of plies and cords of different strengths and stiffness. Accordingly, the forms of the invention disclosed herein should be considered as illustrative of the invention as defined in the following claims.

I claim:

1. A pneumatic tire comprising a tread, two sidewalls extending inwardly from the opposite edges of the tread and having beads at their inner edges, a carcass comprising at least one continuous ply of cords within the sidewalls and underneath the tread, the cords of said continuous ply in one sidewall extending at a different angle to the radii of said tire than the cords of said continuous ply in the other sidewall, and at least one additional ply of cords in said one sidewall, said cords of said additional ply being inclined relative to the radii of said tire, further comprising a pair of plies of reinforcing cords in said tread, the cords in each tread ply being substantially parallel, and the cords in one tread ply being inclined relative to and crossing the cords of the other tread ply, the cords of said tread plies being inclined asymmetrically on opposite sides of the median plane of said tire.

2. A pneumatic tire comprising a tread, two sidewalls extending inwardly from the opposite edges of the tread and having beads at their inner edges, a carcass comprising at least one continuous ply of cords within the sidewalls and underneath the tread, the cords of said continuous ply in one sidewall extending at a different angle to the radii of said tire than the cords of said continuous ply in the other sidewall, and at least one additional ply of cords in said one sidewall, said cords of said additional ply being inclined relative to the radii of said tire, further comprising a pair of plies of reinforcing cords in said tread, said cords in each tread ply being substantially parallel and the cords of one tread ply being inclined relative to and crossing the cords of the other tread ply, said tread plies being axially offset asymmetrically relative to the median plane of said tire.

3. A pneumatic tire comprising a tread, two sidewalls extending inwardly from the opposite edges of the tread and having beads at their inner edges, a carcass comprising at least one continuous ply of cords within the sidewalls and underneath the tread, the cords of said continuous ply in one sidewall extending at a different angle to the radii of said tire than the cords of said continuous ply in the other sidewall, and at least one additional ply of cords in said one sidewall, said cords of said additional ply being inclined relative to the radii of said tire, the cords of said continuous ply extending radially in a first of said sidewalls and nonradially in the second of said sidewalls and beneath the tread, said additional ply of cords being in said second sidewall and said nonradial cords of said continuous ply being in crossing relation to the cords of said additional ply, further comprising at least one ply of reinforcing cords in said tread.

4. The tire set forth in claim 3 comprising a pair of plies of reinforcing cords in said tread, the cords in each tread ply being substantially parallel, and the cords in one tread ply being inclined relative to and crossing the cords of the other tread ply.

5. The tire set forth in claim 3 in which the radius of curvature of one sidewall is different from the radius of curvature of the other sidewall, the sidewall having the larger radius of curvature being less flexible than the other sidewall.

6. The tire set forth in claim 3 in which said additional ply in said one sidewall terminates beneath the edge of the tread adjacent to said one sidewall.

7. A pneumatic tire comprising a tread, two sidewalls extending inwardly from the opposite edges of the tread and having beads at their inner edges, a carcass comprising at least one ply of cords within the sidewalls and underneath the tread, the cords of said one ply in one sidewall extending at a different angle to the radii of said tire than the cords of said ply in the other sidewall, and at least one additional ply of cords in said one sidewall, said cords of said additional ply being inclined relative to the radii of said tire, further comprising at least one ply of reinforcing cords in said tread, said additional ply in said one sidewall extending through said tread and being folded over the edge of said tread ply adjacent to said other sidewall.

8. A pneumatic tire comprising a tread, two sidewalls extending inwardly from the opposite edges of the tread and having beads at their inner edges, a carcass comprising at least one ply of cords within the sidewalls and underneath the tread, the cords of said one ply in one sidewall extending at a different angle to the radii of said tire than the cords of said ply in the other sidewall, and at least one additional ply of cords in said one sidewall, said cords of said additional ply being inclined relative to the radii of said tire, said additional ply in said one sidewall terminating beneath the edge of the tread adjacent to said one sidewall, further comprising a narrow ply extending from said one sidewall and only partially across the width of the tread and spaced from the adjacent edge of said additional ply.

9. A pneumatic tire comprising a tread, two sidewalls extending inwardly from the opposite edges of the tread and having beads at their inner edges, a carcass comprising at least one continuous ply of cords within the sidewalls and underneath the tread, the cords of said continuous ply in one sidewall extending at a different angle to the radii of said tire than the cords of said continuous ply in the other sidewall, and at least one additional ply of cords in said one sidewall, said cords of said additional ply being inclined relative to the radii of said tire, said additional ply extending through both of said sidewalls and beneath said tread and its cords being inclined and in crossing relation to the cords of said one ply.